United States Patent [19]

Tanaka et al.

[11] Patent Number: 5,126,841
[45] Date of Patent: Jun. 30, 1992

[54] MOTION COMPENSATED PREDICTION INTERFRAME CODING SYSTEM

[75] Inventors: Akiyoshi Tanaka, Kawasaki; Satoshi Matsuya, Kanagawa; Ikuo Inoue, Yokohama; Atsushi Nagata, Osaka, all of Japan

[73] Assignee: Matsushita Electric Industrial Co., Ltd., Osaka, Japan

[21] Appl. No.: 596,919

[22] Filed: Oct. 15, 1990

[30] Foreign Application Priority Data

Oct. 13, 1989 [JP] Japan .................................. 1-266477

[51] Int. Cl.⁵ .......................... H04N 7/18; H04N 7/12
[52] U.S. Cl. .................................. 358/105; 358/135; 358/136
[58] Field of Search .................... 358/135, 136, 105

[56] References Cited

U.S. PATENT DOCUMENTS

| 4,723,161 | 2/1988 | Koga | 358/136 |
|---|---|---|---|
| 4,805,017 | 2/1989 | Kaneko et al. | 358/105 |
| 4,821,119 | 4/1989 | Gharavi | 358/136 |
| 4,849,810 | 7/1989 | Ericsson | 358/135 |
| 4,942,465 | 7/1990 | Ohta | 358/136 |

OTHER PUBLICATIONS

Multidimensional Signal Processing of TV Picture, Nikkan Kogyo Shinbun Company, Chapter 7 "Efficient Coding", pp. 213-291 (Nov. 15, 1988).
A Study of a coding intra-loop filter in a motion compensated cosine transform coding system, Denshi--joho-tsushin gakkai ronbun-shi (in Japanese), by K. Matsuda, Y. Kosugi, K. Sakai, Y. Horita and T. Tsuda, vol. J-71A, No. 2, pp. 488-496 (Feb. 1988).

Primary Examiner—John K. Peng
Attorney, Agent, or Firm—Lowe, Price, LeBlanc & Becker

[57] ABSTRACT

A motion compensated prediction interframe coding system which includes a first checking portion for judging whether a motion compensation of a coding block is effective and outputting a motion compensation control signal representing the result of the judgement, a storage portion for storing motion vectors of the coding block and adjacent blocks and the motion compensation control signal, a second checking portion for comparing the motion vector of the coding block, of which the motion compensation should be effected, with each of the motion vectors of the adjacent blocks, of which the motion compensation should be effected, and judging that the intra-loop filtering processing to be performed after the motion compensation is ineffective if the number of the adjacent blocks, of which the motion vectors are identical with that of the coding block, is equal to or more than a predetermined number and that the filtering processing performed after the motion compensation is effective in another case, a motion-compensated brightness calculating portion for calculating motion-compensated brightness of pixels of the blocks, of which the motion compensation is effected, and a predictive brightness calculating portion for calculating predictive brightness of the pixels of the blocks by performing the filtering processing of the motion-compensated brightness of the pixels only if the filtering processing is effective. Thereby, the amount of the generated prediction error signals are reduced, and the picture quality is improved.

6 Claims, 4 Drawing Sheets

1

MOTION COMPENSATED PREDICTION INTERFRAME CODING SYSTEM

BACKGROUND OF THE INVENTION

1. Field of the Invention

This invention generally relates to a television system and more particularly to a motion compensated prediction interframe coding system for performing motion compensated prediction interframe coding of television signals.

2. Description of The Related Art

Recently, with advance in techniques of moving picture coding, a motion compensated prediction interframe coding system has been developed as an efficient coding system for effecting an efficient coding of a color moving picture for use in a visual telephone (or video telephone), a video conference system, CD-ROM, a digital video tape recorder (VTR) and so on. An example of a motion compensated prediction interframe coding system is described in T. Fukinuki: Multidimensional Signal Processing of TV Picture, Nikkan Kogyo Shinbun Company, Chapter 7 "Efficient Coding", pp. 213–291 (1988. 11. 15).

The motion compensated prediction interframe coding system can achieve high efficiency of coding, while it has the following drawback. Namely, when a large quantity of prediction error signals is generated, the motion compensated prediction interframe coding system limits an amount of codes of the generated prediction error signals by making quantization characteristics coarse (i.e., employing a large step size for quantization) in such a way that at the coding of a picture can be achieved a constant frame rate. In case of making quantization characteristics coarse, quantization noises appear in a reproduced picture. The quantization noise is referred to as a block distortion or a mosquito noise and is a factor of degradation of picture quality.

As a system for decreasing the degradation of picture quality, has been proposed a system which performs intra-loop filtering processing, which is two-dimensional lowpass filtering processing, on a motion compensation signal obtained by effecting motion compensation processing on a television signal and computing a prediction signal. In this system, the motion compensation processing results in not only reduction of prediction error signals but decrease in correlation between pixels. Thus, an orthogonal transform (or transformation) of the prediction signals is not effective. Therefore, an additional intra-loop filter is inserted into the system with the intention of recovering the correlation between pixels to obtain the desired effects of the orthogonal transform and to reduce the degradation of picture quality. As an example of such a conventional system, a motion compensated prediction interframe coding system provided with an intra-loop filter (hereunder referred to simply as a prior art system) is disclosed in K. Matsuda et al: "A study of a coding intra-loop filter in a motion compensated cosine transform coding system, Denshi-joho-tsushin gakkai ronbun-shi (in Japanese), Vol. J-71A, No. 2, pp. 488–496 (1988. 2).

Hereinafter, a prior art motion compensated prediction interframe coding system will be described by referring to FIG. 3.

In this figure, reference numeral 41 represents an input terminal from which television signals are inputted to the system; 43 a motion vector calculating portion for comparing a picture signal of a block (hereunder referred to as a coding block), which is to be coded, of a current frame with a reproduced picture signal of a previous frame and calculating a motion vector; 44 a picture memory portion for storing reproduced picture signals of a current and previous frames; 48 a motion compensation predicting portion for performing motion compensation predicting of the reproduced picture signals of the previous frame; 50 an intra-loop filter portion for performing two-dimensional lowpass filtering processing of a motion compensation signal; 52 a prediction error evaluating portion for evaluating a prediction error by computing the difference between an original picture signal and a prediction signal of a coding block; 54 an orthogonal transform portion for performing an orthogonal transform of the selected signal; 56 a quantization portion for quantizing coefficients of an orthogonal transform of the selected signal; 59 an inverse orthogonal transform portion for effecting an inverse orthogonal transform of the quantized coefficients of the orthogonal transform; 61 a reproduced picture calculating portion for calculating a reproduced picture of a current frame; 63 a prediction error coding portion for performing what is called "transmitting channel coding" of a prediction error; 65 a motion vector coding portion for performing the transmitting channel coding portion of a motion vector; 67 a multiplexer portion for computing a transmitting frame on the basis of the prediction code and the motion vector; 69 a code memory portion for temporarily storing a transmitting frame; and 71 an output terminal from which a transmission signal is output.

Hereinafter, an operation of the prior art motion compensated prediction interframe coding system having the above described arrangement will be described.

First, television signals are converted into digital television signals by an analog-to-digital (A/D) conversion circuit (not shown). Then, pixels represented by the digital television signals are divided into blocks each of which is a rectangular array composed of M×N pixels arranged in M rows and N columns. Further, the digital television signals are input to the system from the input terminal 41 as input television signals 42. Then, the motion vector calculating portion 43 compares the input television signal with a reproduced picture signal 45 of a previous frame stored in the picture memory portion 44 and calculating the motion of a coding block as a motion vector and moreover outputs a motion vector signal 46 representing the motion vector. Simultaneously, the motion vector calculating portion 43 judges from the result of the evaluation of the motion vector whether the motion compensation made with respect to the coding block is effective or ineffective. Further, the motion vector calculating portion 43 outputs a motion compensation control signal representing the result of the judgement as the motion vector signal 46. That is, the motion vector signal 46 and the motion compensation control signal are superposed. Next, the motion compensation portion 48 performs the motion compensation of the reproduced television signal 45 of the previous frame by using the motion vector in case where the motion compensation control signal indicates that the motion compensation is effective. In contrast, in case where the motion compensation control signal indicates that the motion compensation is ineffective, the motion compensation portion 48 outputs the reproduced television signal 45 without change as a motion compensation signal 49. Subsequently, the intra-loop filtering portion 50 judges whether filtering processing of the coding block, of which the motion compensation has been effected by using the motion vector, is to be effected in the following way (FILTER ON) or not to be effected (FILTER OFF). Hereunder, this will be referred to as "intra-loop filter control". That is, the intra-loop filtering portion 50 performs the two-dimensional lowpass filtering processing (as shown in FIG. 4) of the motion compensation signal 49 in case where it is judged that the filtering processing of the coding block should be effected (i.e., in case of "FILTER ON"). In contrast, in case where it is judged that the filtering processing of the coding block should not be effected (i.e., in case of "FILTER OFF"), the intra-loop filtering portion 50 outputs the motion compensation signal 49 without change as a prediction signal 51. FIG. 4 is a diagram for illustrating an example of the two-dimensional filtering processing of a block which is an array of $8 \times 8$ pixels (i.e., $M = N = 8$) and is indicated by solid lines therein. Further, numerals 1 and 4 corresponding to pixels denote weighting factors. In this case, the gray level or brightness of a prediction pixel g(i,j) is calculated from the following equation (1) by using that of a motion compensation pixel g(i,j) and those of four horizontal and vertical neighboring pixels or neighbors $g(i-1,j)$, $g(i,j+1)$, $g(i,j-1)$ and $g(i+1,j)$ surrounding the motion compensation pixel:

$$p(i,j) = (\tfrac{1}{8})[4g(i,j) + g(i-1,j) + g(i,j+1) + g(i,j-1) + g(i+1,j)] \quad (1)$$

Incidentally, in case where the motion compensation pixel is on the border of this block (e.g., a pixel positioned at the top left corner of this block as shown in FIG. 4), the filtering processing is performed by finding the gray levels of prediction pixels from the equation (1) using those of pixels of parts (indicated by dashed lines in FIG. 4) of adjacent blocks.

In an "intra-loop filter control" portion of the prior art system, the following judgement is performed when a coding block is a block (hereunder referred to as a motion compensation block) of the motion compensation is effected. First, let (Vx,Vy) denote a motion vector of the coding block. Further, a "motion amount" V is defined by $$V = |Vx| + |Vy| \quad (2)$$

Moreover, the intra-loop filtering processing is performed for a block, for which the following equation (3) with respect to the motion amount V and a predetermined threshold Vth holds, is effected (FILTER ON).

$$V \geq Vth \quad (3)$$

Thus, if Vth=0, the intra-loop filtering processing is performed for all blocks. In contrast, if Vth=∞, it follows that the intra-loop filtering processing is not performed. In the prior art system, in case where Vth=1, there is generated the least amount of codes, and picture quality becomes good. This means that picture quality is improved if the intra-loop filtering processing is performed for a moving block which can move over a predetermined sphere of movement (i.e., $V \geq 1$) and that it had better not perform the intra-loop filtering processing for a stationary block (i.e., $V < 1$).

The prediction error evaluating portion 52 evaluates the difference between the input television signal and the prediction signal of the coding block and outputs a prediction error signal 53 representing the evaluated difference. Further, the orthogonal transform portion 54 performs the orthogonal transform of the prediction error signal 53 to remove therefrom effects of the high-degree correlation between each pair of the neighbors of a prediction pixel corresponding to the prediction error signal 53 and further outputs orthogonal transform coefficients 55. At that time, a discrete cosine transform (DCT), which has a high efficiency of transform and of which firmware may be realized, is usually employed as the orthogonal transform. The quantization portion 56 is a quantizer of which the quantization characteristics varies depending on the amount of the generated codes. Further, the quantization portion 56 quantizes the prediction error orthogonal transform coefficients 55 and outputs prediction error orthogonal transform quantization coefficients 58. The inverse orthogonal transform portion 59 performs the inverse orthogonal transform of the prediction error orthogonal transform quantization coefficients 58 and outputs a quantization-error-containing prediction error signal 60 representing a prediction error which includes a quantization error. Then, the reproduced picture calculating portion 61 adds the prediction signal 51 and the quantization-error-containing prediction error signal 60 and outputs a reproduced picture signal 62 representing a reproduced picture of the coding block. Further, the picture memory 44 stores the reproduced picture signal 62 of the current frame and outputs the reproduced television signal (hereunder sometimes referred to as the reproduced picture signal) 45 of the previous frame. Moreover, the prediction error coding portion 63 performs the coding of the prediction error orthogonal transform quantization coefficients 58 and outputs a prediction error code 64. Furthermore, the motion vector coding portion 65 performs the coding of the motion vector 46 and calculates a motion vector code 66. Thereafter, the multiplexer portion 67 calculates a transmission frame 68, which has a predetermined format, from the prediction error code 64 and the motion vector code 66. Subsequently, the code memory portion 69 stores the transmission frame 68 once and further outputs the transmission frame 68 from the output terminal 71 in synchronization with a clock signal, which is inputted from an external circuit (not shown), as a transmission code 70.

However, in case of the intra-loop filtering control portion of the prior art system as above constructed, when parallel displacement of an entire screen greater than a predetermined size is caused by panning a television camera, the intra-loop processing of a coding block is performed even if the motion vector of the coding block is identical with some of the motion vectors of blocks adjacent to the coding block. Therefore, the prior art system has a drawback that a prediction error, which occurs in the central portion of the area (i.e., the panned screen) of which the parallel displacement is effected, increases and as a result, the picture quality is degraded.

The present invention is created to obviate the drawback of the prior art system.

It is, accordingly, an object of the present invention to provide a motion compensated prediction interframe coding system which performs an intra-loop filtering control operation by checking whether or not a motion vector of a coding block, for which a motion compensation is effected, is identical with a motion vector of a block, for which a motion compensation is also effected, adjacent to the coding block and further inhibiting the intra-loop filtering processing of the coding block if the coding block is a central block of a picture taken by panning a television camera thereby decreasing the prediction error and improving picture quality.

SUMMARY OF THE INVENTION

To achieve the foregoing object and in accordance with the present invention, there is provided a motion compensated prediction interframe coding system which comprises an analog-to-digital conversion means for performing an analog-to-digital conversion of television signals to convert the television signals into digital television signals, a division means for dividing a predetermined area of a television picture represented by the digital television signals into blocks each has a predetermined size, a motion compensation checking means for calculating a motion vector, which represents a motion of a corresponding part of the television picture, of each of the blocks and for judging whether or not a motion compensation of a coding block is effective and for outputting a motion vector signal representing the calculated motion vectors and a motion compensation control signal representing the result of the judgement, a motion vector storage means for receiving the motion vector signal and the motion compensation control signal and for storing the motion vector signal corresponding to the motion vectors of the coding block and those of the blocks adjacent to the coding block and the motion compensation control signal and for outputting a reference motion vector signal representing the motion vector of the coding block, a reference motion compensation control signal representing information represented by the motion compensation control signal and a motion vector information signal representing the motion vectors of the blocks, of which the motion compensation should be effected, and the information represented by the motion compensation control signal, an intra-loop filtering processing control means for receiving the reference motion vector signal and the reference motion compensation control signal, for comparing the motion vector of the coding block, of which the motion compensation should be effected, with each of the motion vectors of the blocks, of which the motion compensation should be effected, adjacent to the coding block, for judging that the intra-loop filtering processing performed after the motion compensation is ineffective in case where the number of the adjacent blocks, of which the motion vectors are identical with that of the coding block, is equal to more than a predetermined positive integer equal to or less than 8 and that the intra-loop filtering processing performed after the motion compensation is effective in another case and for outputting an intra-loop filtering control signal representing the result of the judgement on the effectiveness of the intra-loop filtering processing, a motion-compensated gray level calculating means for receiving the motion vector information signal, for performing the motion compensation of the reproduced picture of a previous frame corresponding to the blocks, of which the motion compensation should be effected, by using the motion vectors, for calculating motion-compensated gray levels of pixels of the blocks, of which the motion compensation should be effected and for outputting a signal representing the result of the motion compensation, which is effected in accordance with the motion vector information signal, of each of the blocks and representing the information represented by the motion vector information signal in case where the motion compensation is not effected as a motion compensation signal, a predictive gray level calculating means for receiving the motion compensation signal and the intra-loop filtering control signal, for calculating predictive gray levels of the pixels of the blocks by performing the intra-loop filtering processing of the motion-compensated gray levels of the pixels only in case where the intra-loop filtering processing of the blocks is effective, for treating the motion-compensated gray levels of the pixels as the predictive gray levels of the pixels of the blocks in another case and for outputting a prediction signal representing the calculated predictive gray levels only in case where the intra-loop filtering processing of the blocks is effective and representing data represented by the motion compensation signal, a prediction error calculating means for receiving the prediction signal and the digital television signal, for calculating the difference between the gray level, which is represented by the digital television signal, of each of the pixels of the coding block and the corresponding predictive gray level thereof as a prediction error and for outputting a prediction error signal representing the prediction error;

an orthogonal transform means for receiving the prediction error signal, for performing an orthogonal transform of the prediction errors and calculating orthogonal transform coefficients and for outputting an orthogonal transform coefficient signal representing the calculated orthogonal transform coefficients;

a quantization means of receiving the orthogonal transform coefficient signal, for quantizing the orthogonal transform coefficients to obtain prediction error orthogonal transform quantization coefficients and for outputting a prediction error orthogonal transform quantization coefficient signal representing the prediction error orthogonal transform quantization coefficients and an inverse orthogonal transform means for receiving the prediction error orthogonal transform quantization coefficient signal, for effecting an inverse orthogonal transform of the prediction error orthogonal transform quantization coefficients to obtain a quantization-error-containing prediction error and for outputting a quantization-error-containing prediction error signal representing the quantization-error-containing prediction error.

The intra-loop filter is considered to serve to restore the effects of the correlation between each pair of the neighbors in the prediction error signal and improve the efficiency of the orthogonal transform by reducing the discontinuity of the prediction signal on the border of the block which occurs in case where the motion vector of a block, of which the motion compensation is effected, is different from that of each of peripheral blocks, of which the motion compensation is also effected, adjacent to the former block by use of a two-dimensional lowpass filter.

However, in case where motion vectors, which are identical to the motion vector of the former block, are generated on the borders of the latter peripheral blocks adjacent to the former block, the possibility of the discontinuity of the prediction signal on the borders of the blocks is considered to be small. It is therefore considered that spatial high frequency components of the prediction signal increase as a result of the two-dimensional lowpass filtering processing, but the amount of the generated prediction error signals is not reduced.

Thus, in case where the motion vector of a coding block is identical with that of a peripheral block adjacent to the coding block, the possibility of the discontinuity of the prediction signal on the borders of these blocks is considered to be small. Therefore, in such a case, the motion compensated prediction interframe coding system according to the present invention does not perform the intra-loop filtering processing for the prediction signal of which the motion compensation has been already performed, thereby reducing the amount of the generated prediction error signal and improving the picture quality.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, the preferred embodiment of the present invention will be described in detail by referring to the accompanying drawings.

Figure 1:
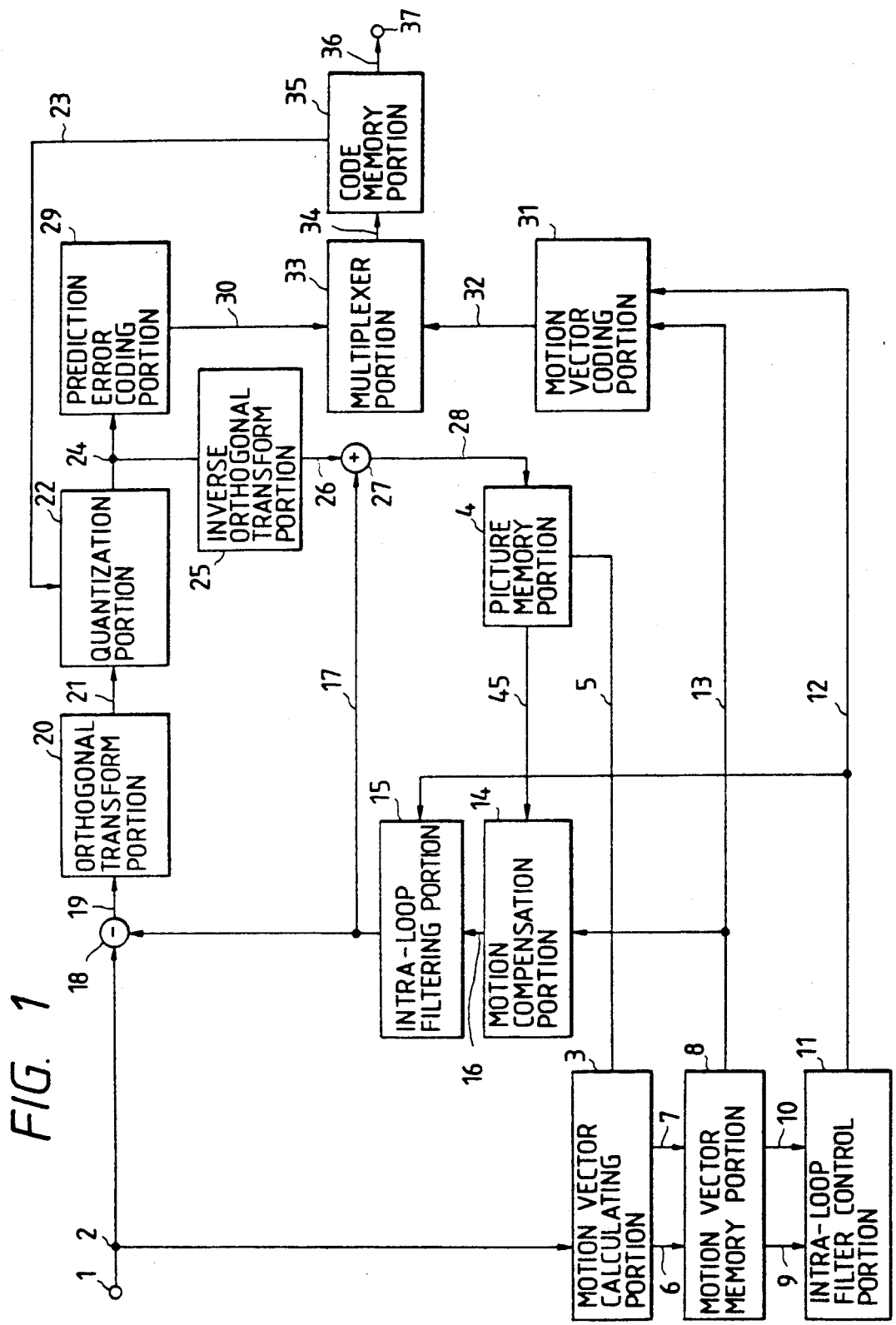
FIG. 1 is a schematic block diagram for showing the construction of a motion compensated prediction interframe coding system embodying the present invention.

Referring first to FIG. 1, there is shown a motion compensated prediction interframe coding system according to the present invention. In this figure, reference numeral 1 represents an input terminal from which television signals are inputted to the system; 3 a motion vector calculating portion for comparing a picture signal of a coding block of a current frame with a reproduced picture signal of a previous frame and calculating a motion vector; 4 a picture memory portion for storing reproduced picture signals of a current and previous frames; 8 a motion vector memory portion for storing a motion compensation control signal and a motion vector; 11 an intra-loop filtering control portion for control intra-loop filtering control processing of a coding block; 14 a motion compensation portion for performing motion compensation of reproduced picture signals of a previous frame; 15 an intra-loop filtering portion for performing two-dimensional lowpass filtering processing of a motion compensation signal; 18 a prediction error evaluating portion for evaluating a prediction error by computing the difference between an original picture signal and a prediction signal of the coding block; 20 an orthogonal transform portion for performing an orthogonal transform of a prediction error signal; 22 a quantization portion for quantizing coefficients of the orthogonal transform; 25 an inverse orthogonal transform portion for effecting an inverse orthogonal transform of the quantized coefficients of the orthogonal transform; 27 a reproduced picture calculating portion for calculating a reproduced picture of a current frame; 29 a prediction error coding portion for performing what is called "transmitting channel coding" of the prediction error; 31 a motion vector coding portion for performing the transmitting channel coding portion of the motion vector; 33 a multiplexer portion for constituting a transmitting frame from the prediction code and the motion vector; 35 a code memory portion for temporarily storing a transmitting frame; and 37 an output terminal from which a transmission signal is output.

Hereinafter, an operation of the prior art motion compensated prediction interframe coding system having the above described arrangement will be described by referring to FIGS. 1 and 2.

First, television signals are converted into digital television signals by a signal processing portion (not shown). Then, pixels represented by the digital television signals are divided into blocks each of which is a rectangular array composed of $M \times N$ pixels arranged in M rows and N columns. Further, the digital television signals are input to this system from the input terminal 1 as input television signals 2. Subsequently, the motion vector calculating portion 3 compares the input television signal 2 with a reproduced picture signal 5 of a previous frame read out of the picture memory portion 4 and calculating a motion vector. Simultaneously, the motion vector calculating portion 3 judges from the result of the evaluation of the motion vector whether the motion compensation made with respect to the coding block is effective or ineffective. Further, the motion vector calculating portion 3 outputs a motion vector signal 6 representing the calculated motion vectors and a motion compensation control signal 7 representing the result of the judgement.

Then, the motion vector memory portion 8 stores the motion vector signal 6 representing the motion vector of the coding block and the motion compensation control signal 7 and outputs a signal representing the stored motion vector and the stored motion compensation control signal as a reference motion vector signal 9 and a reference motion compensation control signal 10, which are used at the time of performing the intra-loop filtering control, respectively.

Figure 2:
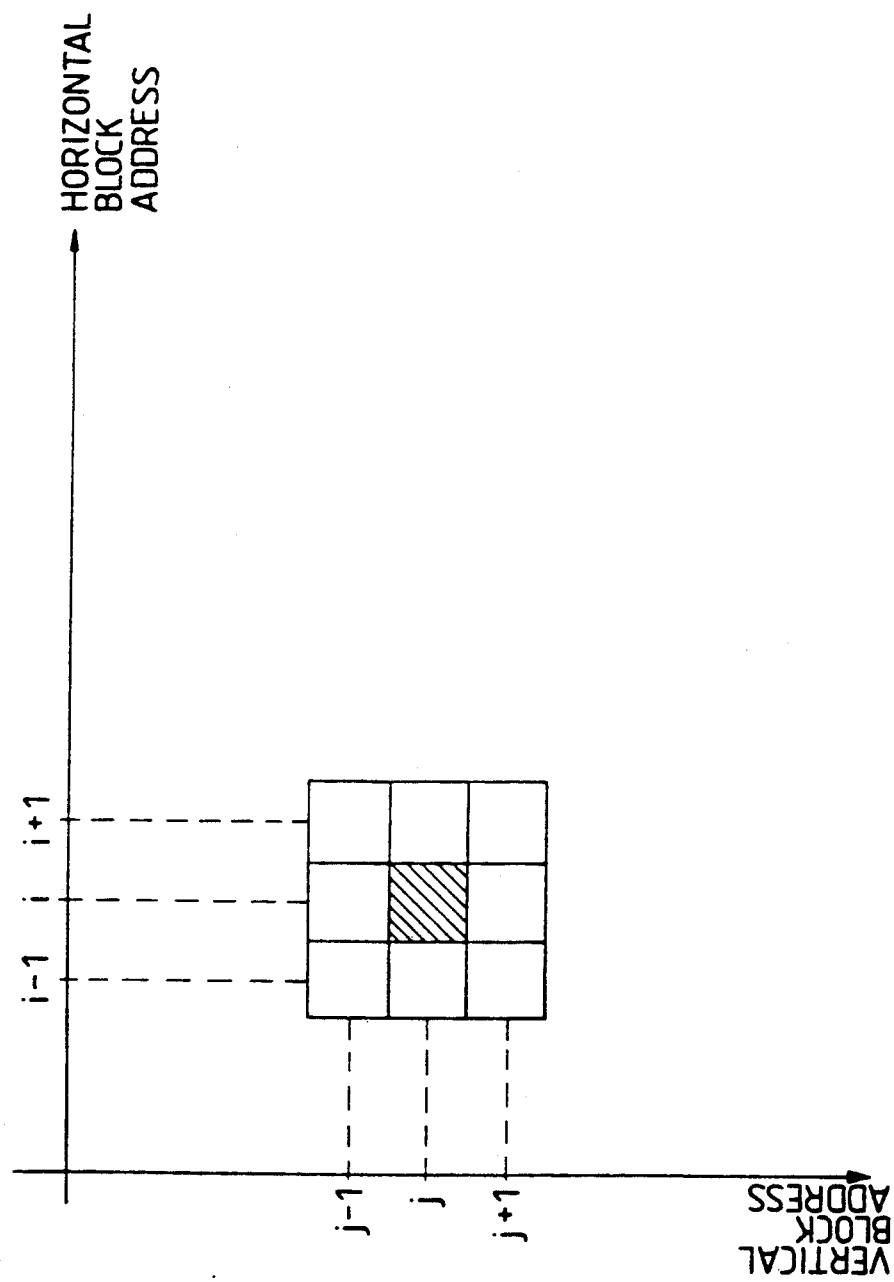
FIG. 2 is a diagram for illustrating an operation of the motion compensated prediction interframe coding system to FIG. 1.
Figure 3:
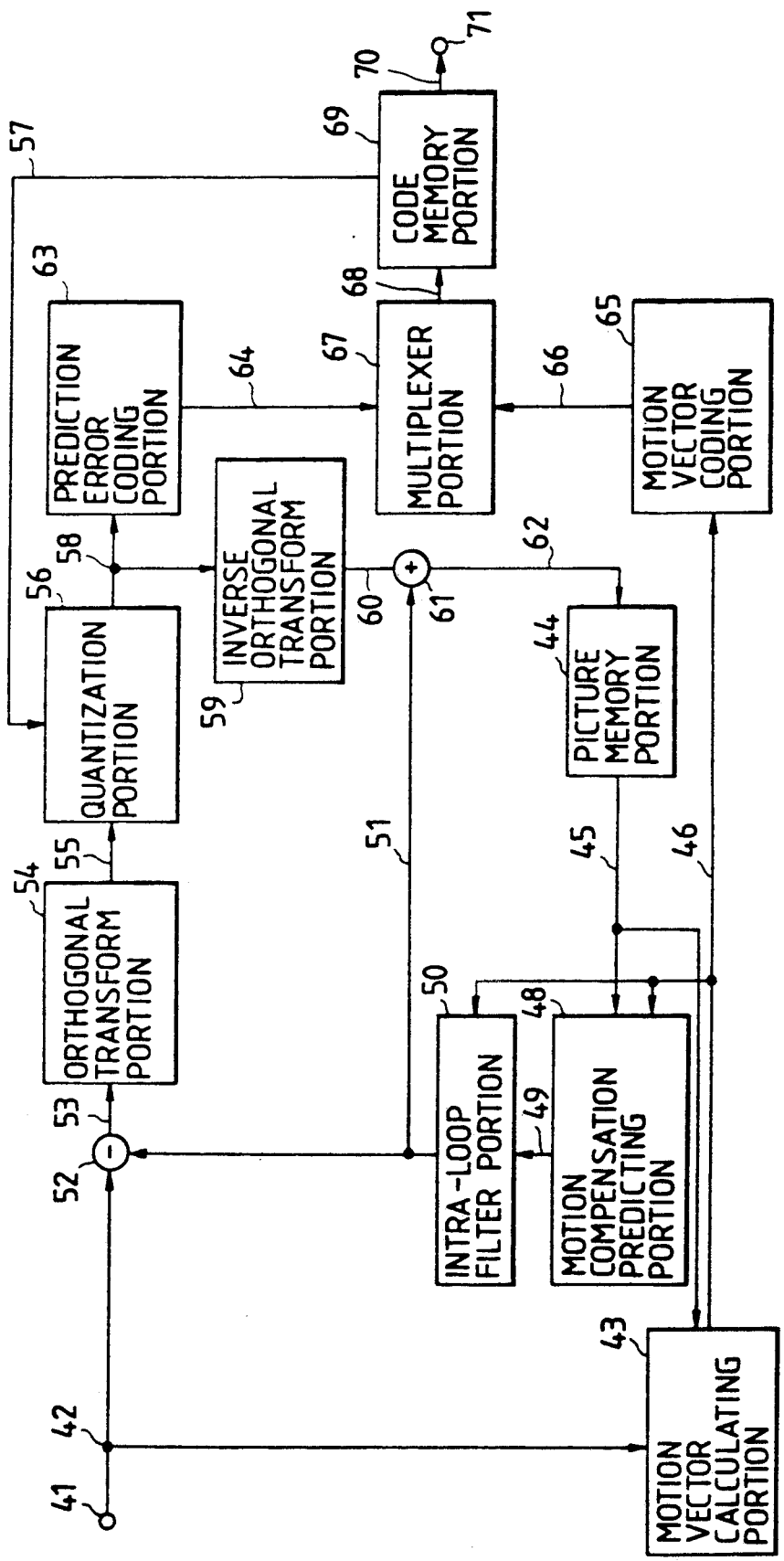
FIG. 3 is a schematic block diagram for showing the construction of a prior art motion compensated prediction interframe coding system.
Figure 4:
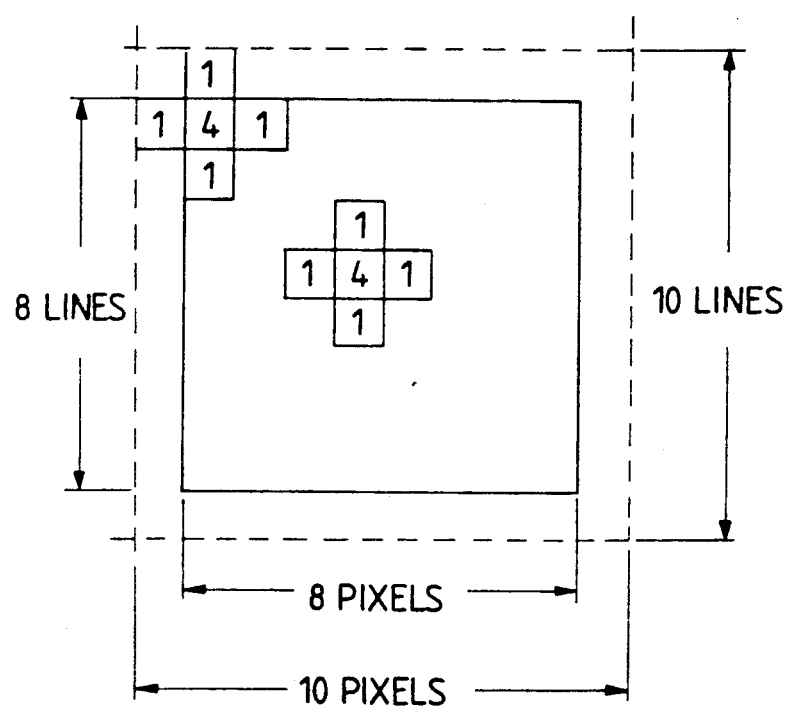
FIG. 4 is a diagram for illustrating two-dimensional lowpass filtering processing of the prior art motion compensated prediction interframe coding system of FIG. 3.

Next, the intra-loop filter control portion 11 calculates motion vectors of a coding block (i,j) and of eight reference blocks $(i-1, j-1) \ldots (i+1, j+1)$ adjacent to the coding block shown in FIG. 2. Upon completion of calculating the motion vectors, the intra-loop filter control portion 11 performs the intra-loop filtering control processing, namely, judges whether or not the intra-loop filtering processing is effected and thereafter outputs an intra-loop filtering control signal 12 representing the result of the judgement.

Hereunder, a process of performing the intra-loop filtering control processing will be described in detail.

First, it is judged whether the coding block is a block of which the motion compensation is effected. If not, the level of the intra-loop filtering control signal 12 is made to be an off-level, and the intra-loop filtering control processing is completed. In contrast, if so, the motion vector (Vx(i), Vy(j)) of the coding block (i,j) is compared with the motion vectors (e.g., (Vx(i−1), Vy(j−1)), (Vx(i+1), Vy(j+1)), ...) of blocks, of which the motion compensation is effected and which are selected from the reference blocks $(i-1, j-1) \ldots (i+1, j+1)$. Then, in case where the number of the adjacent blocks of which the motion vectors are identical with the motion vector of the coding block is equal to or more than a predetermined number K, the level of the intra-loop filtering control signal 12 is made to be an off-level. In case where less than K, the level of the intra-loop filtering control signal 12 is made to be an on-level. According to the result of an experiment, the picture quality was improved if K=4.

Upon completion of the intra-loop filtering processing of the coding block (i,j), a motion vector signal indicating the motion vector of the coding block and the corresponding motion compensation control signal are output from the motion vector memory portion 8 and are superposed as a motion vector information signal 13. Next, the motion compensation portion 14 performs the motion compensation of the reproduced television signal 45 of the coding block by using the motion vector in case where the motion compensation should be effected in accordance with the motion vector information signal 13. In contrast, in case where the motion compensation is not effected, the motion compensation portion 8 outputs the reproduced television signal 45 without change as a motion compensation signal 16. Subsequently, the intra-loop filtering portion 15 performs the intra-loop filtering processing of the motion compensation signal 16 in case where the intra-loop filtering control signal 12 is an on-level. In contrast, in case where the motion compensation control signal 16 is an off-level, the intra-loop filtering portion 15 does not perform the intra-loop filtering processing of the motion compensation signal 16 and outputs the motion compensation signal 16 as a prediction signal 17.

As above described, this intra-loop filtering control processing requires the motion vectors of the eight peripheral blocks adjacent to the coding block for effecting the intra-loop filtering processing. This delays the commencing of the processing of the coding block by a period of time (i.e., a delay time) corresponding to N lines. Further, this delay time is approximately 3 milliseconds in case where the rate of processing frames is 10 frames per second, and the total number of lines of a frame is 286 lines and N=8. Thus, the delay time is negligible.

The prediction error evaluating portion 18 evaluates the difference between the input television signal 2 and the prediction signal 17 of the coding block and outputs a prediction error signal 19 representing the evaluated difference. Further, the orthogonal transform portion 20 performs the orthogonal transform of the prediction error signal 19 to remove therefrom effects of the high-degree correlation between each pair of the neighbors of a prediction pixel corresponding to the prediction error signal 19 and further outputs an orthogonal transform coefficient signal 21 representing orthogonal transform coefficients. At that time, the DCT is usually employed as the orthogonal transform. The quantization portion 22 is a quantizer of which the quantization characteristics varies depending on the amount of the generated codes represented by a generated code amount signal 23. Further, the quantization portion 22 quantizes the prediction error orthogonal transform coefficients 21 and outputs a prediction error orthogonal transform quantization coefficient signal 24 representing prediction error orthogonal transform quantization coefficients. The inverse orthogonal transform portion 25 performs the inverse orthogonal transform of the prediction error orthogonal transform quantization coefficients 24 and outputs a quantization-error-containing prediction error signal 26 representing a prediction error which includes a quantization error. Then, the reproduced picture calculating portion 27 adds the prediction signal 17 and the quantization-error-containing prediction error signal 26 and outputs a reproduced picture signal 28 representing a reproduced picture of the coding block. Further, the picture memory 4 stores the reproduced picture signal 28 of the current frame and outputs the reproduced picture signals 5 and 45 of the previous frame. Moreover, the prediction error coding portion 29 performs the coding of the prediction error orthogonal transform quantization coefficients 24 to obtain a prediction error code and outputs a prediction error code signal 30 representing the prediction error code. Furthermore, the motion vector coding portion 31 performs the coding of the motion vector 13 of the block, of which the motion compensation is effected, and the coding of the intra-loop filtering control signal 12 and calculates a motion vector code and outputs a motion vector code signal 32 representing the calculated motion vector code. Thereafter, the multiplexer portion 33 calculates a transmission frame, which has a predetermined format, from the prediction error code 30 and the motion vector code 32 and outputs a transmission frame signal 34 representing the calculated transmission frame. Subsequently, the code memory portion 35 stores the transmission frame 34 once and further outputs the transmission frame 34 from the output terminal 37 in synchronization with a clock signal, which is inputted from an external circuit (not shown), as a transmission code represented by a transmission code signal 36.

As above described, in this embodiment, the intra-loop filter control portion 11 compares the motion vector of the coding block with those of the blocks adjacent to the coding block. In case where the motion vector of the coding block is identical with that of the adjacent block, it is considered that there is little discontinuity between the prediction signal of the coding block of which the motion compensation has been completed and that of the adjacent block of which the motion compensation has been also completed. Thus, since the intra-loop filtering processing is not effected in this embodiment in such a case, this embodiment can reduce the amount of the generated prediction error signal and improve the picture quality.

While a preferred embodiment of the present invention has been described above, it is to be understood that the present invention is not limited thereto and that other modifications will be apparent to those skilled in the art without departing from the spirit of the invention.

For example, in the above described embodiment, the intra-loop filtering control signal 12 is coded together with the motion vector 13 by the motion vector coding portion 31 which perform the coding of all of the blocks. The coding of the intra-loop filtering control signal 12, however, may be omitted by causing the motion vector coding portion 31 to judge whether or not the intra-loop filtering processing of a decoding block is performed by a decoder (not shown). Furthermore, as described above, in the intra-loop filtering processing, the motion vector of the coding block is first compared with the motion vectors of the adjacent blocks and further the filtering processing is controlled depending on whether the number of the adjacent blocks, of which the motion vectors are identical with the motion vector of the coding block, is equal to or more than the predetermined number K. It is, however, not necessarily needed that the motion vector of the adjacent block is completely matched with that of the coding block in the strict sense. That is, the intra-loop filtering processing may be controlled depending on whether the number of the adjacent blocks, of which the motion vectors are substantially identical with the motion vector of the coding block, is equal to or more than the predetermined number K. Further, the number K depends upon, e.g., the following factors.

(1) Kinds of input moving pictures (i.e., a portrait, a landscape, a seascape, and so on);

(2) Coding rate (i.e., a high-bit-rate or a low-bit-rate);

(3) Ratio of the size of one frame to the entire input picture;

(4) Precision required to determine whether or not the motion vector of an adjacent block is substantially identical with that of the coding block;

(5) Range of the motion vectors of the adjacent blocks to be judged;

(6) Characteristics of the filter; and (7) Device parameters.

The scope of the present invention, therefore, is to be determined solely by the appended claims.

What is claimed is:

1. A motion compensated prediction interframe coding system having an analog-to-digital conversion means for performing an analog-to-digital conversion of television signals to convert the television signals into digital television signals and a division means for dividing a predetermined area of a television picture represented by the digital television signals into blocks each has a predetermined size, said motion compensated prediction interframe coding system comprising:

a motion compensation checking means for calculating a motion vector, which represents a motion of a corresponding part of the television picture, of each of the blocks and for judging whether or not a motion compensation of a coding block is effective and for outputting a motion vector signal representing the calculated motion vectors and a motion compensation control signal representing the result of the judgement;

a motion vector storage means for receiving the motion vector signal and the motion compensation control signal and for storing the motion vector signal corresponding to the motion vectors of the coding block and those of the blocks adjacent to the coding block and the motion compensation control signal and for outputting a reference motion vector signal representing the motion vector of the coding block, a reference motion compensation control signal representing information represented by the motion compensation control signal and a motion vector information signal representing the motion vectors of the blocks, of which the motion compensation should be effected, and the information represented by the motion compensation control signal;

an intra-loop filtering processing control means for receiving the reference motion vector signal and the reference motion compensation control signal, for comparing the motion vector of the coding block, of which the motion compensation should be effected, with each of the motion vectors of the blocks, of which the motion compensation should be effected, adjacent to the coding block, for judging that the intra-loop filtering processing performed after the motion compensation is ineffective in case where the number of the adjacent blocks, of which the motion vectors are identical with that of the coding block, is equal to or more than a predetermined positive integer equal to or less than 8 and that the intra-loop filtering processing performed after the motion compensation is effective in another case and for outputting an intra-loop filtering control signal representing the result of the judgement on the effectiveness of the intra-loop filtering processing;

a motion-compensated gray level calculating means for receiving the motion vector information signal, for performing the motion compensation of the reproduced picture of a previous frame corresponding to the blocks, of which the motion compensation should be effected, by using the motion vectors, for calculating motion-compensated gray levels of pixels of the blocks, of which the motion compensation should be effected and for outputting a signal representing the result of the motion compensation, which is effected in accordance with the motion vector information signal, of each of the blocks and representing the information represented by the motion vector information signal in case where the motion compensation is not effected as a motion compensation signal;

a predictive gray level calculating means for receiving the motion compensation signal and the intra-loop filtering control signal, for calculating predictive gray levels of the pixels of the blocks by performing the intra-loop filtering processing of the motion-compensated gray levels of the pixels only in case where the intra-loop filtering processing of the blocks is effective, for treating the motion-compensated gray levels of the pixels as the predictive gray levels of the pixels of the blocks in another case and for outputting a prediction signal representing the calculated predictive gray levels only in case where the intra-loop filtering processing of the blocks is effective and representing data represented by the motion compensation signal;

a prediction error calculating means for receiving the prediction signal and the digital television signal, for calculating the difference between the gray level, which is represented by the digital television signal, of each of the pixels of the coding block and the corresponding predictive gray level thereof as a prediction error and for outputting a prediction error signal representing the prediction error;

an orthogonal transform means for receiving the prediction error signal, for performing an orthogonal transform of the prediction errors and calculating orthogonal transform coefficients and for outputting an orthogonal transform coefficient signal representing the calculated orthogonal transform coefficients;

a quantization means for receiving the orthogonal transform coefficient signal, for quantizing the orthogonal transform coefficients to obtain prediction error orthogonal transform quantization coefficients and for outputting a prediction error orthogonal transform quantization coefficient signal representing the prediction error orthogonal transform quantization coefficients; and an inverse orthogonal transform means for receiving the prediction error orthogonal transform quantization coefficient signal, for effecting an inverse orthogonal transform of the prediction error orthogonal transform quantization coefficients to obtain a quantization-error-containing prediction error and for outputting a quantization-error-containing prediction error signal representing the quantization-error-containing prediction error.

2. A motion compensated prediction interframe coding system as set forth in claim 1, wherein the predetermined area of the television picture is 1 frame.

3. A motion compensated prediction interframe coding system as set forth in claim 1, wherein the predetermined area of the television picture is 1 field.

4. A motion compensated prediction interframe coding system as set forth in claim 1, 2 or 3, further comprising:

a reproduced picture calculating means for receiving the prediction signal and the quantization-error-containing prediction error signal, for calculating a reproduced picture from the quantized prediction errors and the predictive gray levels of the pixels and for outputting a reproduced picture signal representing the reproduced picture; and a reproduced picture storage means for receiving and storing the reproduced picture signal and for outputting the reproduced picture signal.

5. A motion compensated prediction interframe coding system as set forth in claim 1, 2 or 3, further comprising:

a motion vector coding means for receiving the motion vector information signal and the intra-loop filtering control signal, for coding the motion vector and the result of the judgement on the effectiveness of the intra-loop filtering processing represented by the intra-loop filtering control signal and outputting a motion vector code signal representing the coded motion vector;

prediction error coding means for receiving the prediction error orthogonal transform quantization coefficient signal, for performing the coding of the prediction error orthogonal transforms quantization coefficients to obtain a prediction error code and for outputting a prediction error code signal representing the prediction error code;

a multiplexer means for receiving the motion vector code signal and the prediction error code signal, for calculating a transmission frame, which has a predetermined format, from the prediction error code and the motion vector code and for outputting a transmission frame signal representing the transmission signal; and a code memory means for receiving and storing the transmission frame signal and for outputting a transmission code signal representing the transmission frame and a generated code amount signal representing an amount of the generated codes.

6. A motion compensated prediction interframe coding system as set forth in claim 1, wherein the orthogonal transform is a discrete cosine transform.

* * * * *